United States Patent [19]

Bileck

[11] 4,431,984
[45] Feb. 14, 1984

[54] SIGNAL SYSTEM FOR VEHICLES

[76] Inventor: Carl L. Bileck, 19605 SW. Madeline, Aloha, Oreg. 97005

[21] Appl. No.: 348,857

[22] Filed: Feb. 16, 1982

Related U.S. Application Data

[63] Continuation of Ser. No. 240,776, Mar. 5, 1981, abandoned.

[51] Int. Cl.³ .............................................. B60Q 1/00
[52] U.S. Cl. ...................................... 340/107; 340/84; 340/87; 340/109; 200/61.27
[58] Field of Search ............................. 340/107–110, 340/84, 87, 72, 73, 90, 95, 97, 104, 122, 123, 124, 144, 145, 74; 200/61.27, 61.85; 116/28 R, 35 R, 36, 43, 51

[56] References Cited

U.S. PATENT DOCUMENTS

| 2,483,687 | 10/1949 | Wisuri | 340/107 |
| 2,503,336 | 4/1950 | Hines | 340/107 |
| 2,843,952 | 7/1958 | Zgraggen | 340/107 |
| 2,866,175 | 12/1958 | Slater | 340/107 |
| 3,299,553 | 1/1967 | Newman et al. | 340/124 |
| 3,555,506 | 1/1971 | Davis | 340/56 |
| 3,800,430 | 4/1974 | Samra | 340/95 |

FOREIGN PATENT DOCUMENTS 1145021 3/1969 United Kingdom ............... 340/107

Primary Examiner—Donnie L. Crosland
Attorney, Agent, or Firm—Eugene M. Eckelman

[57] ABSTRACT

Auxiliary turn indicators are provided in combination with the usual turn signals to issue a courtesy request in the event that following drivers do not heed the turn signals. Such auxiliary indicators comprise arrows in combination with a courtesy request such as the word "Please". The indicators may be installed in a housing at the rear window of the vehicle or be embedded in the glass. A further indicator is provided that issues a "Thank You" when the following driver heeds the courtesy request. The system may be combined with the usual turn signals.

1 Claim, 5 Drawing Figures

SIGNAL SYSTEM FOR VEHICLES

This application is a continuation of application Ser. No. 240,776, filed Mar. 5, 1981 now abandoned.

BACKGROUND OF THE INVENTION

This invention relates to new and useful improvements in signal systems for vehicles and particularly pertains to turn signals.

Present day vehicles are equipped with right and left turn signals by means of which a driver can indicate turning intentions to following drivers. In freeway travel, it is oftentimes difficult to change from one lane to another since following drivers do not pay attention to the conventional turn signals.

SUMMARY OF THE INVENTION

According to the present invention and forming a primary objective thereof, a turn signal system is provided for vehicles which is used in combination with the usual turn signals and which is designed to issue a special plea to following drivers, such special plea being intended to obtain compassion from drivers who ordinarily otherwise refuse to yield to a vehicle trying to change lanes.

The objectives of the invention are accomplished by providing visual electric courtesy request indicating means arranged to be mounted on a vehicle so as to be visible from the rear. The indicating means comprise auxiliary means arranged to provide a turn request to following drivers upon the failure of such following drivers to heed the turn signals. The courtesy request indicating means may be incorporated in a housing for mounting at the rear window of a vehicle, or in new constructions such indicating means may be embedded in the glass. The indicating means preferably comprise an arrow to show the direction in which turn is desired in combination with a courtesy word such as "Please". The system also includes a courtesy word greeting arranged to be energized upon the granting of the courtesy. The system may be employed in combination with the conventional turn signal actuating means so that a common lever, such as the conventional turn signal lever, can be used to actuate both the signals and the courtesy request indicating means. The arrangement is such that the courtesy word greeting which is energized after granting of the courtesy is actuated by the same lever.

The invention will be better understood and additional objects and advantages will become apparent from the following description taken in conjunction with the accompanying drawings.

DETAILED DESCRIPTION OF PREFERRED EMBODIMENTS

Figure 1:
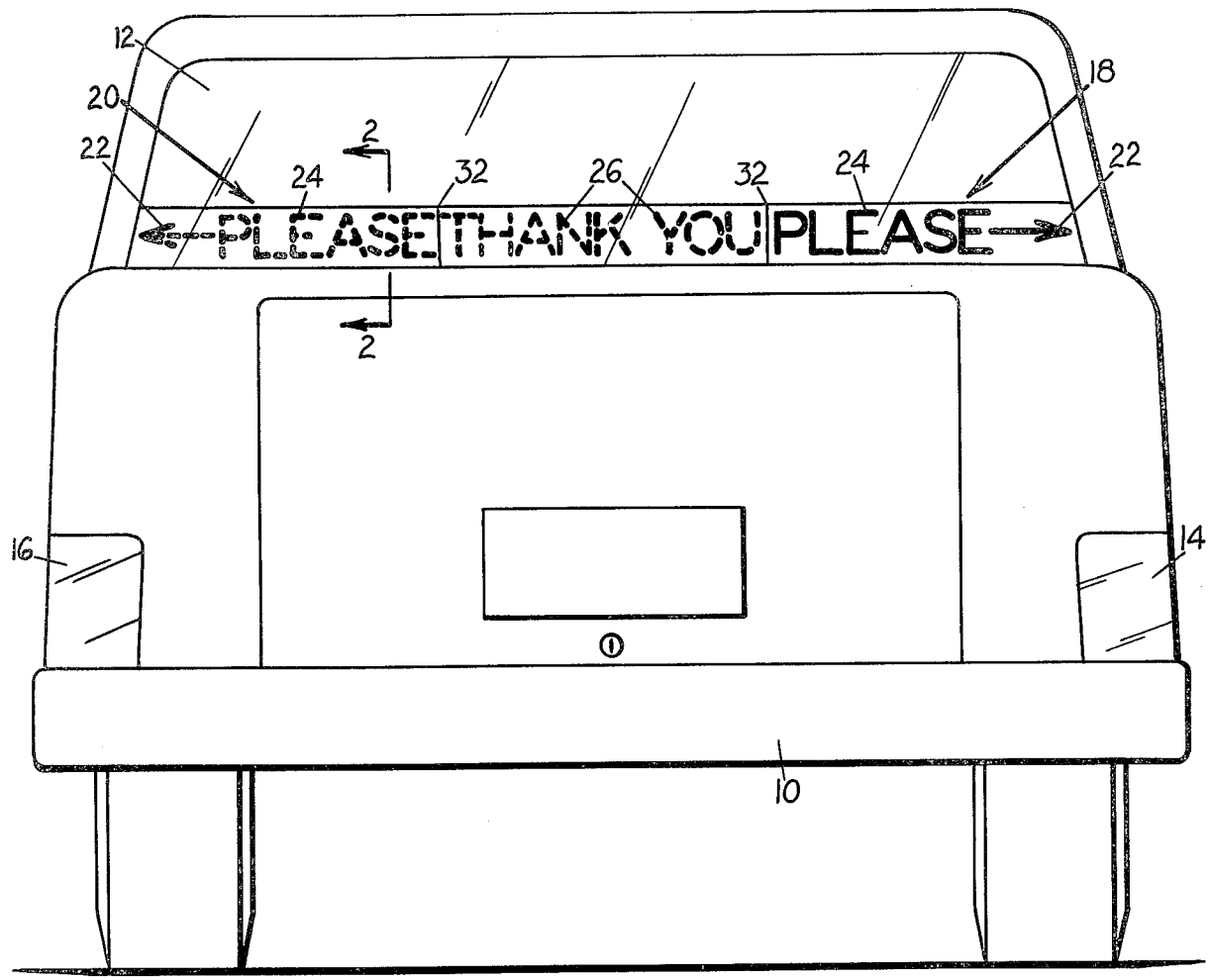
FIG. 1 is a rear elevational view of a vehicle showing the courtesy request indicating means of the invention installed in the rear window thereof.

With particular reference to FIG. 1, the numeral 10 designates a vehicle having a rear window 12 and the usual right and left turn signal lights 14 and 16, respectively.

According to the invention, a visual courtesy request is combined with the vehicle which is visible from the rear of the vehicle and which produces an extra plea to following drivers to allow a change in lanes. Such a courtesy request comprises indicating means 18 on the right side and indicating means 20 on the left side, each of such indicating means including an arrow 22 and a courtesy request word or symbol 24 such as the word "Please". The left request is shown in broken lines and the right request is shown in full lines, this distinction resulting from the fact that the right request is shown as being energized.

Also associated with the indicating means is a courtesy word greeting arranged to be energized after a following driver has granted the courtesy. The courtesy word greeting is designated by the numeral 26 and may comprise the word "Thank You". The latter indicating means is preferably located centrally between the other two indicating means.

Figure 2:
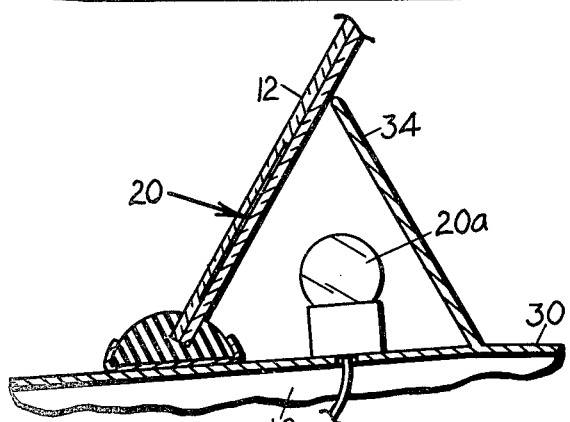
FIG. 2 is an enlarged sectional view taken on the line 2—2 of FIG. 1 and showing a first embodiment of the invention.

One manner of mounting the indicating means 18, 20 and 26 is illustrated in FIG. 2 wherein such indicating means is embedded in the rear window 12 of the vehicle, such as between layers of glass or plastic forming its construction. One or more lights 18a (FIG. 5), 20a (FIGS. 2 and 5), and 26a (FIG. 5), associated with the respective indicating means 18, 20 and 26, are supported on a rear shelf 30 of the vehicle 10 whereby upon energization thereof the indicating means 18, 20, or 26 is made visible. The three indicating means are separated by partitions 32 in the housing. A shield 34 extends integrally from the shelf 30 and is disposed between the lighting means and the driver to prevent glare within the vehicle.

Figure 3:
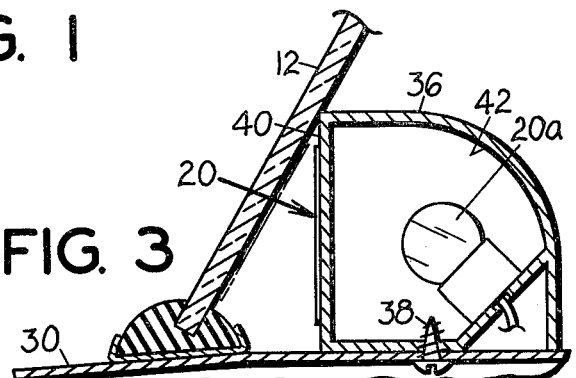
FIG. 3 is a view similar to FIG. 2 but showing another embodiment.

In another embodiment, FIG. 3, a self-contained housing 36 is arranged to be mounted at the rear window 12 within the vehicle and this housing encloses the lighting means 20a and the other means 18a and 26a therein. This housing is attached to the shelf 30 of the vehicle by suitable means, such as by screws 38. The rearwardly facing wall 40 of the housing 36 is transparent and has the indicating means 18, 20 or 26 secured or otherwise formed thereon. The other walls of the housing 36 are opaque to prevent glare within the vehicle. The inner wall surfaces of the housing, except for the rear wall 40, may include reflective means 42.

Figure 4:
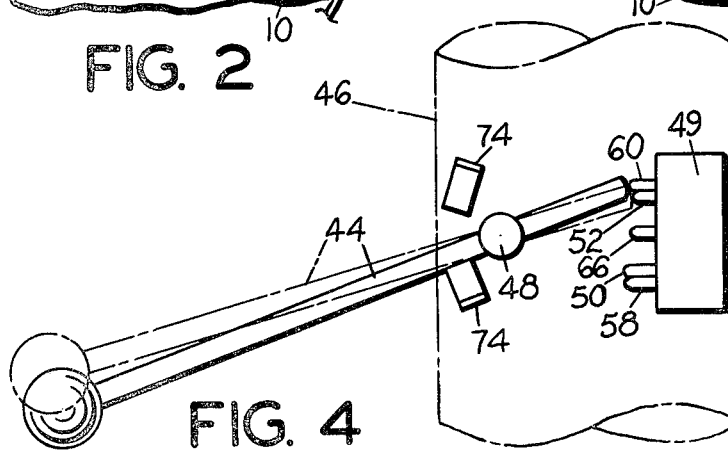
FIG. 4 is an elevational view of signal actuating means.

Suitable means are provided in the driver's compartment for actuating each of the indicating means 18 or 20 as the need arises and also for actuating the indicating means 26 to provide a courtesy greeting after a following driver has allowed the lane change to be made. According to the present invention and as seen in FIG. 4, the operating means of the invention may be combined with the operating means of the conventional turn signal lights 14 and 16. In this arrangement, a turn signal lever 44 is pivotally supported on a steering column 46 by means of a pivot pin 48, and the inner end of this lever is arranged for engagement with a plurality of switches in a housing 49 for operating the turn signal lights 14 and 16 as well as the lights 18a, 20a, and 26a of indicating means 18, 20 and 26, respectively.

Figure 5:
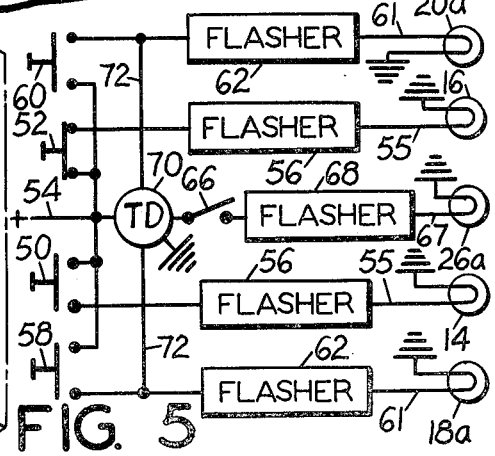
FIG. 5 is a wiring diagram of electric circuitry illustrating an exemplary arrangement of the invention.

The arrangement shown comprises a first pair of normally open switches 50 and 52 which as best seen in FIG. 5 control power from an input line 54 through circuits 55 to the respective turn signal lights 14 and 16. Conventional flashers 56 are in these circuits. A pair of normally open switches 58 and 60 in circuits 61 are closely associated respectively with switches 50 and 52, and these switches control power from input line 54 to the respective indicating means 18a and 20a. Circuits 61 to the indicating lights 18a and 20a also include flashers 62.

The arrangement of the lever 44 and switches is such that in a first position of the lever it is arranged to engage a switch 50 or 52 but upon further movement of the lever past said switches it will engage the switches 58 or 60. A pair of such positions of lever 44 is shown in full and broken lines in FIG. 4. The arrangement is also such that when the lever has been moved into engagement with switch 58 or 60 it will still maintain the respective switch 50 or 52 closed whereby there will be a simultaneous flashing of the turn signal lights and the courtesy request indicating means. When the lever 44 is moved to a neutral position, both the turn signal lights and the courtesy request indicating means will be energized.

In the arrangement shown in FIGS. 4 and 5, the light or lights 26a of courtesy greeting 26 is energized by a switch 66 engageable by the lever 44 in the neutral position of the latter and incorporated in a circuit 67 between the input line 54 and the light 26a. Circuit 67 also has a flasher 68 therein and further includes a time delay mechanism 70 having a circuit connection 72 with each of the circuits 61 of the lights 18a and 20a of the indicating means 18 and 20, respectively. The time delay 70 is of electrical structure whereby it is armed when either of the circuits 61 is energized and then when switch 66 is closed such time delay will be actuated to allow operation of the indicating means 26 for a selected time only. It is thus apparent that once one or the other of the circuits to the indicating means 18 and 20 has been energized, the indicating means 26 will be automatically energized when the lever 44 is returned to neutral, it being preferred that the indicating means 26 be made to flash on and off possibly three or four times before it automatically turns off.

The lever 44 is associated with stop means 74 to limit its pivotal movement.

In operation, when the driver desires to energize the turn signal lights 14 or 16, the lever 44 is moved against the selected switch 50 or 52. This will operate the turn signal lights in the conventional manner. Such lever can be turned off manually or by conventional release structure that returns it to neutral after a turn has been made. Since the time delay mechanism 70 has not been armed, light 26a will not operate when lever 44 closes the switch 66. If the driver wishes to change lanes and his turn signal lights are not being recognized by following drivers, he moves the lever 44 past the switch 50 or 52 for the turn signal light, such as to either of the switches 58 or 60 whereby to energize the courtesy request indicating means 18 or 20. Such indicating means will flash as long as they are left on. Assuming that the following driver or drivers recognize the courtesy plea, the driver can then change lanes, at which time the lever 44 is returned to neutral and this in turn energizes the courtesy indicating means 26. Such indicating means will flash three or four times and then shut off automatically.

It is to be understood that the forms of my invention herein shown and described are to be taken as preferred examples of the same and that various other changes in the shape, size and arrangement of parts may be resorted to without departing from the spirit of my invention, or the scope of the subjoined claims. For example, the indicating means of the invention may be incorporated in any portion of a vehicle just as long as it is visible from the rear. Also, such structure can have individual actuating means apart from actuating means for the conventional turn signals.

Having thus described my invention, I claim:

1. A signal system for vehicles comprising
   (a) an electric circuit;
   (b) right and left turn signal means in said circuit arranged to be mounted at the rear of a vehicle;
   (c) right and left courtesy request turn indicating means in said circuit arranged to be mounted on a vehicle so as to be visible from the rear of the vehicle;
   (d) said turn indicating means comprising right and left indicating arrows and a courtesy word request which provide a turn request to a following driver to be used upon the failure of such following driver to heed a turn signal of the vehicle,
   (e) a visual electric courtesy word greeting in said system arranged to be mounted on a vehicle so as to be visible from the rear for expressing gratitude to a following driver upon his giving the right of way after viewing said visual electric courtesy request indicating means,
   (f) a movable hand operated lever having a neutral position and also having a pair of first engaging positions and a pair of second engaging positions associated with respective ones of said first engaging positions,
   (g) first switch means in said circuit operated by said hand lever in its first engaging positions for controlling operation of respective right and left turn signal means,
   (h) second switch means in said circuit operated by said hand lever in its second engaging positions for controlling operation of respective right and left courtesy request turn indicating means,
   (i) third switch means at said neutral position of said lever,
   (j) said second engaging positions of said switches being located past their respective first engaging positions whereby said lever in moving to its second engaging positions is arranged to first engage said first switch means,
   (k) and control means in said circuit arranged to be armed by movement of said lever to said second positions and arranged upon return of said lever from its second engaging positions to its neutral position in engagement with said third switch means to provide a timed operation of said courtesy word greeting.

* * * * *